(12) United States Patent
Wilson

(10) Patent No.: US 11,702,302 B2
(45) Date of Patent: Jul. 18, 2023

(54) AUTOMATED UNLOADING SPEED CONTROL

(71) Applicant: Körber Supply Chain LLC, DFW Airport, TX (US)

(72) Inventor: Eric S. Wilson, Flower Mound, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 1022 days.

(21) Appl. No.: 16/527,252

(22) Filed: Jul. 31, 2019

(65) Prior Publication Data

US 2021/0032051 A1 Feb. 4, 2021

(51) Int. Cl.
B65G 65/00 (2006.01)

(52) U.S. Cl.
CPC .... B65G 65/005 (2013.01); *B65G 2201/0285* (2013.01)

(58) Field of Classification Search
None
See application file for complete search history.

(56) References Cited

U.S. PATENT DOCUMENTS

| | | | | |
|---|---|---|---|---|
| 5,082,415 A * | 1/1992 | Hayashi | ................. | B65G 67/20 414/398 |
| 5,538,391 A * | 7/1996 | Bonnet | ................ | B65G 59/005 414/796.5 |
| 9,623,569 B2 * | 4/2017 | McCollum | ............. | B65G 67/24 |
| 9,738,466 B2 * | 8/2017 | Pippin | ..................... | B65G 67/24 |
| 10,035,657 B2 * | 7/2018 | Hartmann | ............... | B65G 21/14 |
| 10,173,573 B2 * | 1/2019 | Jones | ......................... | B60P 1/38 |
| 10,336,562 B2 * | 7/2019 | Girtman | ................. | B65G 67/26 |
| 10,618,752 B2 * | 4/2020 | Heitplatz | ........... | B65G 47/5131 |
| 10,787,325 B1 * | 9/2020 | Pippin | ..................... | B65G 57/03 |
| 10,807,805 B2 * | 10/2020 | Clucas | ................... | B65G 59/02 |
| 10,836,591 B2 * | 11/2020 | Enenkel | ................. | B65G 67/08 |
| 11,161,704 B2 * | 11/2021 | Carpenter | ................ | G05B 6/02 |
| 11,434,090 B2 * | 9/2022 | Harres | ................... | B65G 65/02 |
| 2002/0153229 A1 * | 10/2002 | Gilmore | ................. | B65G 67/08 198/568 |
| 2009/0074546 A1 * | 3/2009 | Christensen | ......... | B65G 41/008 198/803.16 |
| 2009/0169349 A1 * | 7/2009 | Reed | ...................... | B65G 67/08 414/809 |
| 2010/0296902 A1 * | 11/2010 | Aschpurwis | ........... | B65G 67/24 414/499 |

(Continued)

*Primary Examiner* — Jonathan M Dager
(74) *Attorney, Agent, or Firm* — Price Heneveld LLP

(57) ABSTRACT

A method for automated unloading of items from a container includes moving a nose ramp of an unloader under a base belt, which is positioned over a floor of the container. A stack of items are located in the container over the base belt. The method includes removing items from a bottom of the stack of items via an extraction conveyor of the unloader. The method also includes measuring a density of items transitioning onto the extraction conveyor from the base belt. The method further includes controlling an unloader advance speed relative to the container in dependence of the measured density of items transitioning onto the extraction conveyor. Thereby, a bulk flow of items having a substantially steady density is delivered by an output conveyor of the unloader positioned downstream of the extraction conveyor.

15 Claims, 3 Drawing Sheets

(56) References Cited

U.S. PATENT DOCUMENTS

| | | | |
|---|---|---|---|
| 2011/0123307 A1* | 5/2011 | Pillard | G07B 17/00467 |
| | | | 414/795.4 |
| 2012/0087770 A1* | 4/2012 | Pippin | B65G 67/08 |
| | | | 414/801 |
| 2013/0230373 A1* | 9/2013 | Pippin | B65G 67/24 |
| | | | 198/618 |
| 2016/0236881 A1* | 8/2016 | Ito | B65G 69/24 |
| 2016/0280477 A1* | 9/2016 | Pippin | B65G 67/08 |
| 2018/0009550 A1* | 1/2018 | Thøgersen | B64F 1/368 |
| 2020/0048019 A1* | 2/2020 | Werner | B65G 35/06 |
| 2021/0347588 A1* | 11/2021 | Harres | B65G 67/24 |
| 2022/0073292 A1* | 3/2022 | Shivalinga | B65G 65/005 |

* cited by examiner

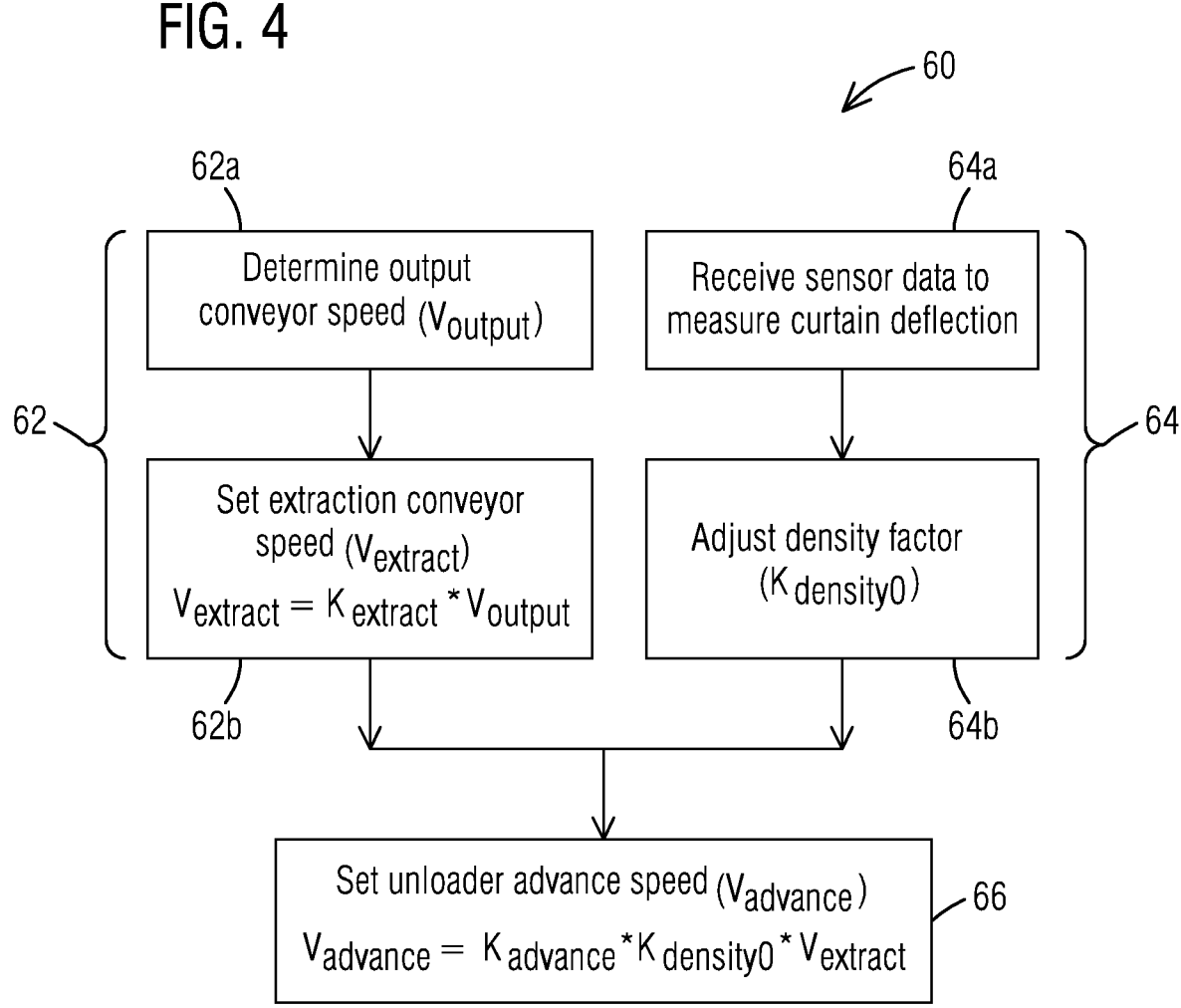

AUTOMATED UNLOADING SPEED CONTROL

BACKGROUND

1. Field

The present disclosure relates in general to the field of mail and parcel processing, and in particular, to an automated unloading system and associated method.

2. Description of the Related Art

Many parcel processing facilities deploy bulk unloading of items from loaded trailers or shipment containers. Automated unloaders capable of extracting items in bulk have a significantly higher throughput than manual unloaders or automated unloaders which convey a single item at a time (known as singulated flow unloaders). The improved efficiency for bulk unloading is central to the economic justification of such automation.

A bulk stream unloader may pose the challenge of an inherent flow mismatch into and out of downstream devices such as singulators, which regulate item flow rate (by controlling the spaces between successive items) rather than volumetric flow rate.

SUMMARY

Briefly, aspects of the present disclosure relate to speed control of an automated unloading operation. Aspects of the present disclosure may enable an automated unloader to supply a steady density of items to be processed in a parcel hub.

According to a first aspect, a method is provided for automated unloading of items from a container. The method comprises moving a nose ramp of an unloader under a base belt, the base belt being positioned over a floor of the container. A stack of items are located in the container over the base belt. The method comprises removing items from a bottom of the stack of items via an extraction conveyor of the unloader. The method further comprises measuring a density of items transitioning onto the extraction conveyor from the base belt. The method further comprises controlling an unloader advance speed relative to the container in dependence of the measured density of items transitioning onto the extraction conveyor. Thereby, a bulk flow of items having a substantially steady density is delivered by an output conveyor of the unloader positioned downstream of the extraction conveyor.

According to a second aspect, an automated unloading system is provided. The system comprises an unloader and a controller. The unloader comprises a nose ramp configured to pass under a base belt, the base belt being positioned over a floor of a container. A stack of items are located in the container over the base belt. The unloader further comprises an extraction conveyor configured to remove a first item of the stack of items from the base belt, and an output conveyor positioned downstream of the extraction conveyor. The unloader further comprises a stack control curtain configured to retain a second item of the stack of items during the removal of the first item. The stack control curtain is mounted on an unloader frame and is configured to deflect in relation to the unloader frame as a function of a force exerted by the stack of items on the stack control curtain. The controller is configured to control an unloader advance speed relative to the container in dependence of a deflection of the stack control curtain. The deflection of the stack control curtain is indicative of a density of items transitioning onto the extraction conveyor from the base belt. A bulk flow of items having a substantially steady density is delivered by the output conveyor.

BRIEF DESCRIPTION OF THE DRAWINGS

The invention is shown in more detail by help of figures. The figures show preferred configurations and do not limit the scope of the invention.

FIG. 4 is a flowchart illustrating an example of a method for dynamically adjusting an unloader advance speed.

DETAILED DESCRIPTION

Figure 1:
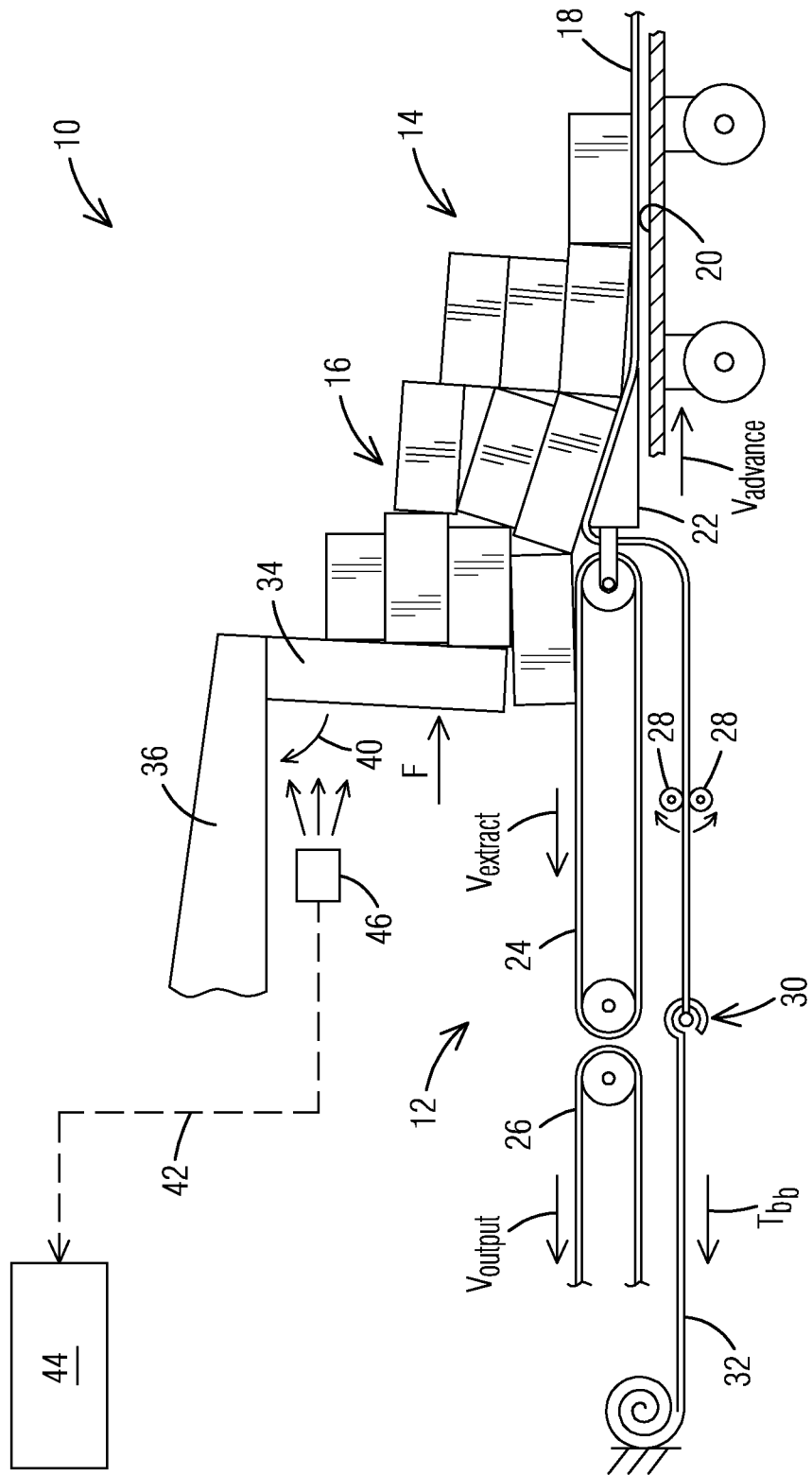
FIG. 1 is a schematic view of an automated unloading system.

In the following detailed description of the various embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

In a parcel processing facility, it is desirable to have items (e.g. parcels) remain comingled in a bulk state whenever possible. This improves efficiency but has the effect of requiring singulation from bulk when items must be handled individually, such as in the sorting and loading steps. Ideally, the processing rates of unloading, of sorting (including input singulation), and of loading would be balanced so that across the overall process, each step would run at a steady, optimal rate. Typically, in practice, all elements of the overall process are highly dynamic, and affected by different factors, so that variations in processing rate are generally not synchronized. Furthermore, certain elements are highly sensitive to over-provisioning, which may reduce productivity.

The output of a singulator may be optimized by controlling the spaces between successive items. A singulator therefore regulates item flow rate rather than volumetric flow rate. If items vary in size, volumetric flow rate and item density (defined as items per unit area) on the subsequent conveyors would be continuously changing. Thus, there is an inherent mismatch in the flow into and out of the singulator. To alleviate the flow mismatch, the speed of the bulk flow conveyor into the singulator may be reduced until the singulator is able to process the higher density stream. Failure to adjust for the mismatch would cause the singulator to become overfed and struggle to produce the desired spacing between singulated items. Overfeeding may result in errors downstream of the singulator because subsequent equipment may be designed for specific minimum spacing between items.

Compensating for flow mismatch using speed changes of the bulk flow conveyor may be achieved by maintaining the item density of the bulk flow conveyor to be substantially constant. If the input bulk flow conveyor happened to have a very high item density at the moment it was commanded to go slower, then the singulator would continue to receive more items than it could process and the overfeed would continue. When a bulk flow conveyor changes speed, the speed of upstream conveyors would also generally be adjusted to prevent changes in item density. Hence, the speed change would generally be propagated from the singulator back to the output conveyor of the unloader.

Aspects of the present disclosure pertain to automated bulk stream unloaders that address, among others, the problem of maintaining a consistent or steady item density at the output conveyor of the unloader, even when the speed of the output conveyor fluctuates due to a downstream command.

FIG. 1 schematically illustrates portion of an automated unloading system 10 of a parcel processing facility, according to one embodiment. The automated unloading system 10 may comprise at least one, possibly multiple unloaders 12, one of which is illustrated herein. A trailer or container 14 is positioned adjacent to a loading dock for unloading. Within the container 14 are loaded items 16, which are to be unloaded by the unloader 12. The stack of items 16 are positioned on top of a base belt 18, which is positioned on a floor 20 of the container 14. The base belt 18 may be installed into the container 14 and may cover the floor 20 of the container 14, whereby the items 16 are loaded normally on the base belt 18.

The unloader 12 may be positioned at the open door of the container 14, for example by an operator at an operator console. The operator may, for example, use a video camera (not shown) that is mounted to the unloader 12 or to the loading dock and presents the operator with a view of the unloader 12 and the container 14. The unloader 12 may include a positioning mechanism, which may be remotely operated by the operator to position the unloader 12 at the entrance to the container 14. The positioning mechanism may, for example, be a motorized caster or other mechanism suitable for positioning the unloader 12 relative to the container 14 prior to initiating an unloading process or during the unloading process. The positioning mechanism may be operable to position the unloader 12 at least along a longitudinal axis of the container 14 or horizontally relative to the container 14.

Figure 2:
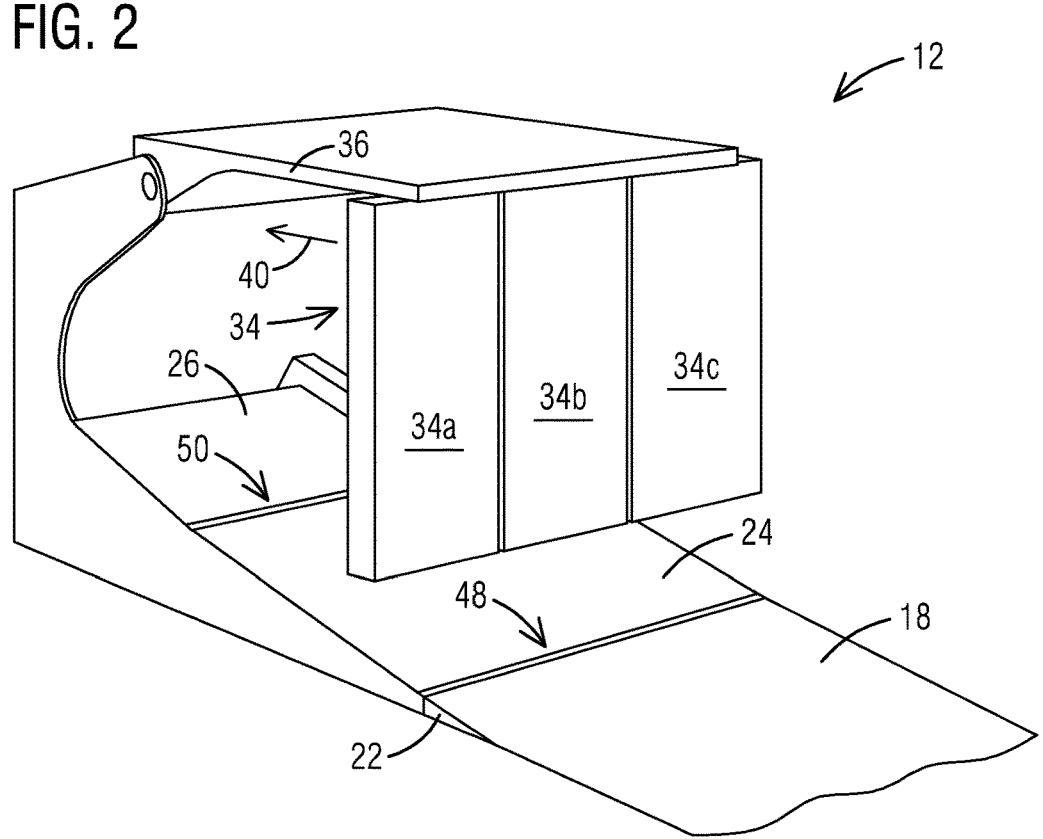
FIG. 2 is a simplified perspective view of an unloader according to an example embodiment.

The unloader 12 includes a nose ramp 22, an extraction conveyor 24 and an output conveyor 26. The unloader 12 may further include at least one stack control curtain 34 mounted on an unloader frame 36, as best illustrated in FIG. 2. The stack control curtain 34 is configured to support the stacked items 16 as they are extracted from the container 14. At the time of unloading, the nose ramp 22 is passed under the base belt 18. In the shown example embodiment, the base belt 18 is further routed over the nose ramp 22, between the nose ramp 22 and extraction conveyor 24, through pinch rollers 28, and is coupled at a coupling 30 to a tensioning roller 32. The pinch rollers 28 and the tensioning roller 32 herein comprise a tensioning mechanism for the base belt 18. The tensioning roller 32 maintains a desired tension $T_{bb}$ on the base belt 18 via the coupling 30.

During an unloading operation, the unloader 12 advances relative to the container 14. In one embodiment, the unloader 12 may move itself forward under the base belt 18 and loaded items 16 by using the pinch rollers 28 to pull on the base belt 18. In other embodiments, the unloader 12 may move itself forward using the positioning mechanism of the unloader (described above), wherein the tensioning roller 32 may be operated to maintain the base belt 18 taut over the nose ramp 22. It is to be noted that the term "unloader advance speed" as used in this specification refers to a speed of relative advancement of the unloader 12 toward the container 14. In many implementations, the container 14 is stationary and the unloader 12 is in motion to move into the container, for example in a manner described above. However, in other implementations, the unloader 12 can be substantially or entirely stationary, while the container 14 is moved onto it. In such cases, the unloader 12 is still seen as advancing into the container, in a relative sense, and so the descriptions herein are intended to apply to those cases as well.

Figure 3:
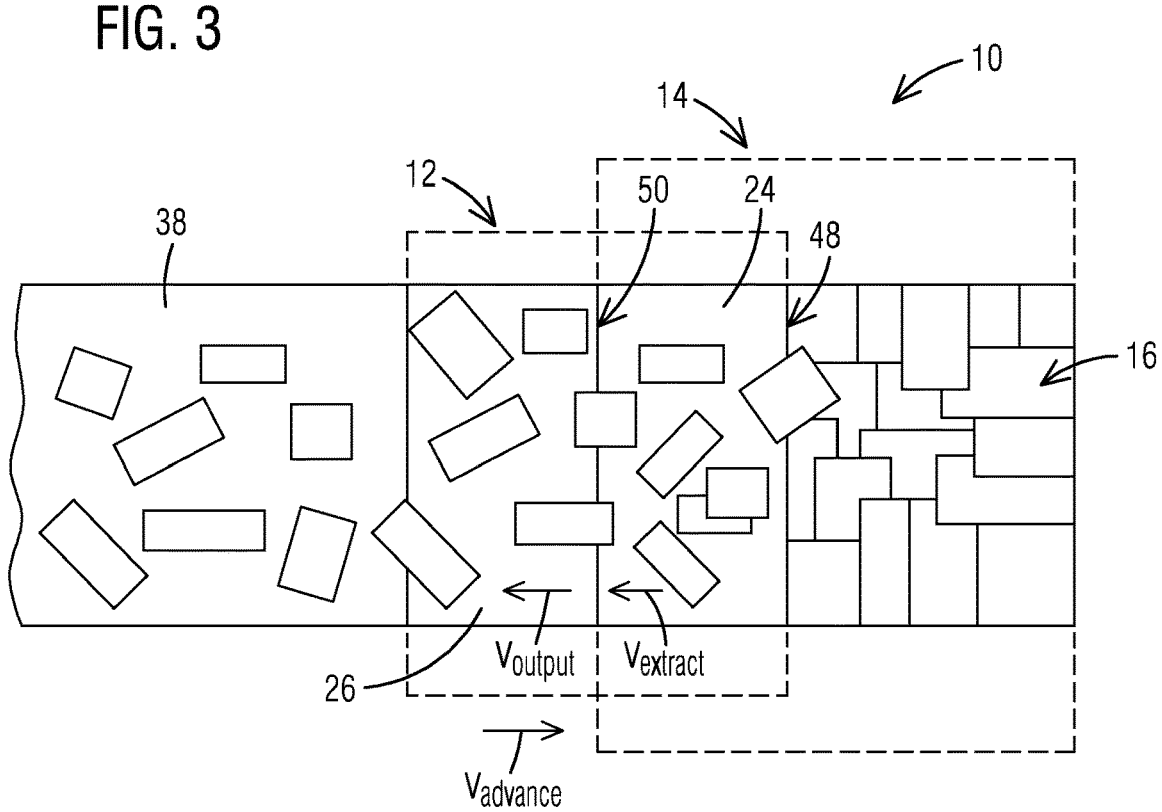
FIG. 3 is a schematic plan view showing an automated unloader conveyor configuration.

As the unloader 12 moves into the container 14 along the container floor 20, the nose ramp 22 slides under a rearmost item of the stack of items 16. By sliding the nose ramp 22 under an item while the item remains on the base belt 18, the unloader 12 reduces the possibility of the nose ramp 22 pushing the item into the container 14, and rather causes the item to slide up onto the extraction conveyor 24. Once on the extraction conveyor 24, a lowest, rearmost item of the items 16 is carried under the stack control curtain 34 out of the container 14 along the extraction conveyor 24, onto the output conveyor 26 which feeds into a bulk conveyor or collector 38. The above is best illustrated in FIG. 3, which shows a plan view of the conveyor configuration when the unloader 12 has advanced into the container 14.

Referring back to FIG. 1, as the lowest, rearmost items are removed by the extraction conveyor 24, some of the items located higher up are retained by the stack control curtain 34. The stack control curtain 34 may be designed to apply a controlled force F against the stack of items 16, for example via a pneumatic air cylinder or other spring mechanism, for supporting the stack of items 16 during the relative advancement of the unloader 12 toward the container 14. The controlled force F may be configured so as to allow the stack control curtain 34 to deflect in relation to the unloader frame 36 as a function of a force exerted by the stack of items 16 on the stack control curtain 34. The deflection is indicated by the arrow 40.

As stated above, it is desirable for the output conveyor 26 to have a substantially steady item density, even as the speed of the output conveyor 26 may be adjusted based on a downstream command, to avoid overfeeding of downstream devices. In the present description, the term "density" is defined as the number of items per unit area. Item density on the output conveyor 26 may be influenced by complex relationships between several variables, including but not limited to: item properties (size, shape, weight, material), height and internal pressure of the stack in the container, friction properties of the items and the equipment, unloader advance speed $V_{advance}$ in relation to extraction conveyor speed $V_{extract}$, and extraction conveyor speed $V_{extract}$ in relation to output conveyor speed $V_{output}$. The present disclosure describes a technique for dynamically controlling the unloader advance speed $V_{advance}$, such that some of the effects of the continuous, uncontrollable changes in the other the factors may be offset to produce a more even item density on the output conveyor 26. Thereby, the speed change commands from downstream operations and varying item sizes would affect unloader throughput, but not density on the output conveyor 26.

Item density on a conveyor line changes as items transition from one conveyor to the next according to the speed ratio between the two conveyors, as defined by the following relationship:

$$\rho_{out}/\rho_{in}=V_{in}/V_{out} \tag{1}$$

where $\rho_{in}$ and $\rho_{out}$ respectively denote item densities on an upstream conveyor and a downstream conveyor, and $V_{in}$ and $V_{out}$ respectively denote speeds of the upstream conveyor and the downstream conveyor.

For example, if a conveyor is moving half as fast as its downstream conveyor, the density will decrease by a factor of two when the items transition between the conveyors. It is to be noted that in this case, the system throughput would not be affected. However, with a given density, throughput could be adjusted by changing the speed of the upstream conveyor.

Referring to FIGS. 2 and 3, the illustrated unloader 12 has at least two conveyor transitions 48, 50 where item density may be adjusted. The transition 50 from extraction conveyor 24 to the output conveyor 26 may incorporate a simple speed ratio as described above in equation (1). A more pertinent transition 48 is where items transition from a static position in the container 14 to the extraction conveyor 24. The density on the extraction conveyor 24 then will be affected by the density of items at the stack face in the container 14 (height of the stack, item size, etc.) and the speed ratio between unloader advance speed $V_{advance}$ and extraction conveyor speed $V_{extract}$. A challenge here is to avoid fluctuating density on the output conveyor 26 when the density inside the container 14 may fluctuate greatly (e.g., short stack versus stack reaching the ceiling). As per the present disclosure, the above challenge is addressed by measuring a density of items transitioning onto the extraction conveyor 24 from the base belt 18, and controlling the unloader advance speed $V_{advance}$ in dependence of the measured density of items transitioning onto the extraction conveyor 24. Thereby, a bulk flow of items having a substantially steady density is delivered by the output conveyor 26. To this end, the unloading system 10 may be provided with a controller 44 for dynamically controlling a speed setting $V_{advance}$ in accordance with the method described herein. The controller 44 may, for example, be part of a centralized computer system of the parcel processing facility, or may be a dedicated controller associated with an individual unloader/unloading operation, or may have any other configuration.

In the described embodiment, the measurement the density of items transitioning onto the extraction conveyor 24 is implemented by measuring a deflection of the stack control curtain 34 in relation to the unloader frame 36. The stack control curtain 34 presents a physical barrier for preventing the entire stack of items from being transported by the extraction conveyor 24. However, continued unloader advance motion would overload the extraction conveyor 24 and produce an overly dense stream of items and possibly lead to system jams or damage to the items. To prevent this situation, the curtain deflection is used herein as an indication of the density of items transitioning onto the extraction conveyor 24.

As shown in FIG. 1, the automated unloading system 10 may be provided with at least one sensor 46, such as a position sensor, for dynamically measuring a deflection of the stack control curtain 34 and communicating a signal 42 indicative of measurement data to the controller 44. In one embodiment, the sensor 46 may include an analog position sensor, such as a laser sensor, which may be positioned, for example, on the unloader frame 36. Referring to FIG. 2, in the shown example, the unloader 12 is provided with multiple stack control curtains, individually identified as 34a, 34b, 34c. The stack control curtains 34a-c are arranged laterally adjacent to each other (i.e., along a width of the unloader 12), each being supported on the unloader frame 36. Each stack control curtain 34a-c may be configured to deflect independently as a function of the force exerted on the respective stack control curtain 34a-c by the stack of items 16, to allow greater control to prevent the stack of items 16 from collapsing. To that end, a plurality of sensors 46 may be provided for measuring the deflections of the individual stack control curtains 34a-c. In this case, in order to measure the density of items transitioning onto the extraction conveyor 24, the maximum deflection among the stack control curtains 34a-c may be considered.

FIG. 4 depicts a method 60 for dynamically adjusting an unloader advance speed during an unloading operation, according to an example embodiment. The method may be executed by the controller 44 of the automated unloading system 10. Such a controller 44 may include a processor, which may be configured to execute the steps of the described method. As per the exemplary method 60, the unloader advance speed is determined in dependence of a speed of the extraction conveyor 24 and a measured density of items transitioning onto the extraction 24 conveyor from the base belt 20. The method 60 broadly comprises functional blocks 62 pertaining to setting a speed of the extraction conveyor 24, and functional blocks 64 pertaining to measuring a density of items transitioning onto the extraction conveyor 24 from the base belt 20. It is to be noted that the blocks 62 and 64 are not meant to be implemented in any particular sequence, and may, in many embodiments, be implemented simultaneously.

First, the functional blocks 62 will be described. Block 62a of the method involves determining a speed $V_{output}$ of the output conveyor 26 of the unloader 12. In one embodiment, the output conveyor speed $V_{output}$ may be adjusted based on a downstream demand, for example, to avoid overfeeding of a downstream device, such as a singulator. Such overfeeding may be monitored, for example, by employing vision-based sensor systems on certain sections of the singulator. Based on data from the vision-based sensor systems, the speed of the input bulk flow conveyor of the singulator may be adjusted. This speed change may then be propagated upstream all the way to the output conveyor 26 of the unloader 12, for example by employing appropriate sensors and speed control mechanisms at the conveyor transitions. Depending on the downstream command, the output conveyor speed $V_{output}$ may be adjusted dynamically or may remain constant during the unloading operation.

Block 62b involves setting the speed $V_{extract}$ of the extraction conveyor 24. The extraction conveyor speed $V_{extract}$ may be adjusted responsive to changes in the output conveyor speed $V_{output}$. In particular, the extraction conveyor speed $V_{extract}$ may be controlled in a manner such that $V_{extract}$ varies directly proportional to $V_{output}$, to ensure that the item density on the output conveyor 26 does not fluctuate due to changes in the output conveyor speed $V_{output}$ based on downstream commands. The above is based on the assumption that the density on the extraction conveyor 24 is substantially steady, which is achieved by the present method, as described below. In the illustrated example, the extraction conveyor speed $V_{extract}$ may be set based on the relationship:

$$V_{extract} = K_{extract} * V_{output} \quad (2)$$

where $K_{extract}$ is a constant to define a desired change in density of items at a transition 50 between the extraction conveyor 24 and the output conveyor 26.

Next, the functional blocks 64 will be described. Block 64a of the method involves measuring a deflection of the stack control curtains 34 in relation to the unloader frame 36. This may involve receiving and sampling sensor data from one or more sensors 46 measuring curtain deflection, such as that described above. Block 64b involves dynamically adjusting a density factor $K_{density0}$, which may be defined to have a value between 0 and 1 based on a measured density of items transitioning onto the extraction conveyor 24.

Herein, the deflection of the stack control curtains 34 (i.e, the maximum measured deflection among the plurality of stack control curtains 34a-c) is considered indicative of the density of items transitioning onto the extraction conveyor 24 from the base belt 20. This enables the factor $K_{density0}$ to be assigned a value based the amount of deflection detected in the stack control curtains 34. For example, the factor $K_{density0}$ may be assigned a value of 1 when the stack control curtains 34 are in an undeflected state (0% stroke), and assigned a value of zero when at least one of the stack control curtains 34a-c is pushed back to a fully retracted state (100% stroke).

Block 66 of the method involves setting the unloader advance speed $V_{advance}$ based on the relationship:

$$V_{advance} = K_{advance} * K_{density0} * V_{extract} \quad (3)$$

where $K_{advance}$ is a constant to define a desired change in density between the relatively static items in the container 14 and items in the extraction conveyor 24, and $K_{density0}$ is a factor between 0 and 1 based on a measured density of items as they transition onto the extraction conveyor 24.

In accordance with the present method, for a highly dense stack, the value of $K_{density0}$ would approach zero to slow the unloader advance speed $V_{advance}$ compared to the extraction conveyor speed $V_{extract}$ and maintain an acceptable density of items being pulled onto the extraction conveyor 24. For example, if the stack control curtains 34 are pushed back by a maximum of 25% of the stroke, $K_{density0}$ would be set to 0.75 to reduce speed $V_{advance}$ by 25%. Similarly, if at least one of the stack control curtains 34a-c is fully retracted, i.e., pushed back by 100% of its stroke, it is an indication of too many parcels on the extraction conveyor 24. In such a case $K_{density0}$ might be set to 0, whereby unloader advance motion could be halted until the extraction conveyor 24 is able to process enough items to allow the stack control curtains 34 to partially extend. The unloader advance speed $V_{advance}$ may therefore be dynamically adjusted based on the deflection of the stack control curtains 34, to ensure that a bulk flow of items having a substantially steady density is delivered by the output conveyor 26.

It should be noted that while the present disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. An automated unloading system, comprising:
an unloader, comprising:
a nose ramp configured to pass under a base belt, the base belt being positioned over a floor of a container, wherein a stack of items are located in the container over the base belt;
an extraction conveyor configured to remove a first item of the stack of items from the base belt, and an output conveyor positioned downstream of the extraction convey; and
a stack control curtain configured to retain a second item of the stack of items during the removal of the first item;
wherein the stack control curtain is mounted on an unloader frame and is configured to deflect in relation to the unloader frame as a function of a force exerted by the stack of items on the stack control curtain; and
a controller configured to control an unloader advance speed relative to the container in dependence of a deflection of the stack control curtain, the deflection being indicative of a density of items transitioning onto the extraction conveyor from the base belt, whereby a bulk flow of items having a substantially steady density is delivered by the output conveyor.

2. The automated unloading system according to claim 1, wherein the controller is configured to dynamically adjust the unloader advance speed as a function of a speed of the extraction conveyor and a measured deflection of the stack control curtain.

3. The automated unloading system according to claim 2, wherein the speed of the extraction conveyor is maintained directly proportional to a speed of the output conveyor.

4. The automated unloading system according to claim 3, wherein the speed of the output conveyor is dynamically adjusted based on a downstream command.

5. The automated unloading system according to claim 3, wherein the speed of the output conveyor is maintained constant.

6. The automated unloading system according to claim 1, wherein the stack control curtain is one of the unloader a plurality of stack control curtains arranged laterally adjacent to each other and supported on the unloader frame, each stack control curtain being configured to deflect independently as a function of the force exerted on the respective stack control curtain by the stack of items.

7. The automated unloading system according to claim 6, wherein the controller is configured to control the unloader advance speed in dependence of a maximum deflection among the plurality of stack control curtains.

8. The automated unloading system according to claim 1, further comprising:
a sensor for dynamically measuring a deflection of the stack control curtain and communicating a signal indicative of measurement data to the controller.

9. The automated unloading system according to claim 1, wherein the stack control curtain is configured to apply a controlled force against the stack of items.

10. A method for automated unloading of items from a container, comprising:
providing the automated unloading system according to claim 1;
moving the nose ramp of the unloader under the base belt;

removing items from a bottom of the stack of items via the extraction conveyor of the unloader;

measuring a density of items transitioning onto the extraction conveyor from the base belt; and controlling the unloader advance speed relative to the container in dependence of the measured density of items transitioning onto the extraction conveyor, whereby the bulk flow of items having the substantially steady density is delivered by the output conveyor of the unloader positioned downstream of the extraction conveyor.

11. The method according to claim 10, wherein measuring the density of items transitioning onto the extraction conveyor comprises measuring a deflection of a stack control curtain in relation to an unloader frame on which the stack control curtain is mounted, the stack control curtain being configured to support the stack of items and to deflect in relation to the unloader frame as a function of a force exerted by the stack of items on the stack control curtain.

12. The method according to claim 10, comprising dynamically adjusting the unloader advance speed based on the relationship:

$$V_{advance} = K_{advance} * K_{density0} * V_{extract};$$

where:

$V_{advance}$ is the unloader advance speed, $V_{extract}$ is a speed of the extraction conveyor, $K_{advance}$ is a constant to define a desired change in density between items in the container and items in the extraction conveyor, and $K_{density0}$ is a factor between 0 and 1 based on a measured density of items transitioning onto the extraction conveyor.

13. The method according to claim 12, comprising setting the speed of the extraction conveyor based on the relationship:

$$V_{extract} = K_{extract} * V_{output};$$

where:

$V_{output}$ is a speed of the output conveyor, and $K_{extract}$ is a constant to define a desired change in density of items at a transition between the extraction conveyor and the output conveyor.

14. The method according to claim 13, comprising dynamically adjusting the speed of the output conveyor based on a downstream command.

15. The method according to claim 13, comprising maintaining the speed of the output conveyor to be constant during an unloading operation.

\* \* \* \* \*